United States Patent [19]

Masuda

[11] Patent Number: 4,737,110

[45] Date of Patent: Apr. 12, 1988

[54] MONITORING APPARATUS FOR TRAINING DEVICES

[75] Inventor: Akira Masuda, Kanagawa, Japan

[73] Assignee: Sony Corporation, Tokyo, Japan

[21] Appl. No.: 3,410

[22] Filed: Jan. 15, 1987

[30] Foreign Application Priority Data

Jan. 29, 1986 [JP] Japan ................................. 61-17608

[51] Int. Cl.⁴ ............................................... G09B 7/00
[52] U.S. Cl. ..................................... 434/350; 434/336
[58] Field of Search ................................. 434/336, 350

[56] References Cited

U.S. PATENT DOCUMENTS

| | | | |
|---|---|---|---|
| 3,647,926 | 3/1972 | Rohloff et al. | ........................ 434/336 |
| 3,716,929 | 2/1973 | Barrabas | .............................. 434/336 |
| 3,783,257 | 1/1974 | Friedman et al. | ................... 434/350 |
| 4,004,354 | 1/1977 | Yamauchi | ............................ 434/336 |
| 4,310,317 | 1/1982 | Nomura et al. | . |

FOREIGN PATENT DOCUMENTS 2939187 4/1980 Fed. Rep. of Germany .

Primary Examiner—Leo P. Picard
Attorney, Agent, or Firm—Lewis H. Eslinger

[57] ABSTRACT

A monitoring apparatus for training devices has control switches for selecting audio signals output from a plurality of respective training devices arranged in columns and rows and for obtaining an output signal to be monitored, scanning direction selectors actuable for selecting a scanning direction from the directions of the columns and rows, respectively, and coordinate step advancing devices operable in one of the column and row directions in response to actuation of the respective scanning direction selector for causing the control switches to successively select one-by-one the audio signals output from the training devices which are successively arranged in the selected column or row scanning direction.

5 Claims, 5 Drawing Sheets

MONITORING APPARATUS FOR TRAINING DEVICES

BACKGROUND OF THE INVENTION

1. Field of the Invention

This invention relates generally to a monitoring apparatus for training devices and more particularly to such a monitoring apparatus which is adapted to select one of a plurality of training devices and to monitor an audio signal transmitted therefrom.

2. Description of the Prior Art

In a so-called LL (Language Laboratory) system, in order to permit an instructor or teacher to observe the progress of many trainees or students, each of which is trained in a booth provided with a respective training device, the instructor monitors one-by-one, for example, through a pair of headphones or the like, audio signals, such as, the pronunciation of various words or phrases by the several trainees, transmitted from the respective booths to a monitoring apparatus provided at a control desk for the instructor. Such an apparatus is disclosed, for example, in Laid-open Japanese Patent Publication No. 60-15076.

FIG. 1 shows a monitoring system according to the prior art, wherein tape recorders including respective audio signal amplifiers $A_{11}$ to $A_{mn}$ are located in N booths arranged in a matrix having m rows and n columns, that is, $N = m \times n$. Audio signals, such as, the pronunciation of words and phrases in a foreign language by the several trainees, are collected by microphones M in the respective booths and are supplied to the monitoring apparatus provided on the control desk for the instructor. The monitoring apparatus is shown to include audio signal input terminals $1_{-1}, 1_{-2}, \ldots, 1_{-N}$ and control circuits or switches $2_{-1}, 2_{-2}, 2_{-N}$, each of which corresponds to a respective one of the N booths. Output signals from the control circuits $2_{-1}, 2_{-2}, \ldots, 2_{-N}$ are all supplied to a monitor amplifier 3, and the output signal from the latter is supplied to a pair of headphones HP through an output terminal 4 for monitoring by the instructor. A shift register 9 is supplied with an output signal from a pulse generator 11 through a selector circuit 12, and respective output signals from the shift register are supplied to the control circuits $2_{-1}, 2_{-2}, 2_{-N}$ in an order according to a scanning command signal from a scanning direction change-over circuit 13. Such scanning command signal is indicative of a desired scanning direction, that is, the forward direction or backward direction, so that the output signals from amplifiers $A_{11}$ to $A_{mn}$ corresponding to the respective trainees are supplied one by one to the monitoring apparatus. Thus, the instructor can monitor, one by one, the progress of each trainee. The monitoring apparatus according to the prior art is further shown to have a manual scanning change-over circuit 14 having a push button adapted to be momentarily depressed for causing the pulse generator 11 to be temporarily inhibited from generating its normal pulsed output signal, and for causing one scanning command pulse signal indicative of the forward direction or the backward direction to be supplied to shift register 9 through selector circuit 12 so that the instructor monitors the trainee in the booth next to that which was previously monitored. If the above-mentioned push-button is kept depressed, the period of inhibition of the output signal from pulse generator 11 is made to be a predetermined period of time by an output signal from change-over circuit 14, that is, pulse generator 11 issues successive pulses with an increased period therebetween, so that the instructor can successively monitor the several trainees one at a time for the predetermined or increased period of time.

By the way, in using the described language laboratory system, a plurality of training programs are prepared for trainees having different levels of skill, and the trainees are classified into a number of groups, in accordance with their respective skills or degrees of advancement. The monitoring apparatus is provided with a group selector switch and a program selector switch (not shown), which supply the control circuits $2_{-1}, 2_{-2}, \ldots, 2_{-N}$ with suitable control signals so that the instructor can successively monitor trainees who belong to the same group or who study the same program.

However, when the monitoring apparatus has its control circuits $2_{-1}, 2_{-2}, \ldots, 2_{-N}$ supplied with various control signals as described above, the control circuits in the monitoring apparatus, as well as peripheral circuits including the network between the control desk and the several booths become complicated. Further, the number of control keys is increased, so that the instructor's operation of the control keys of the monitoring apparatus is complicated and made difficult.

To solve this problem, it has been proposed that the N booths be divided into groups by row or column, with trainees in the same row or column having the same skill level or degree of advancement, and thus using the same study program.

In Japan, it is the tendency to arrange the booths in groups by the column. Therefore, it is sufficient if the instructor can monitor the trainees one by one in a selected column.

On the other hand, in countries foreign to Japan, the booths are, in many cases, grouped by row. It is therefore impossible to employ, in a country foreign to Japan, an unmodified monitoring apparatus intended for use in Japan. For this reason, at the time of manufacture, the scanning direction for successive monitoring has to be changed from the column direction to the row direction by the use of a bit switch or the like provided in the monitoring apparatus. Therefore, the monitoring apparatus for use in Japan and those for export from that country, must be carefully distinguished from each other during production and during preparation for shipping.

OBJECTS AND SUMMARY OF THE INVENTION

Accordingly, it is an object of the present invention to provide a monitoring apparatus for training devices which is capable of freely setting the scanning direction for successive monitoring to a selected one of forward, backward, left, and right directions.

According to one aspect of the present invention, there is provided a monitoring apparatus for training devices which comprises control switch means for selecting audio signals output from a plurality of respective training devices arranged in columns and rows and for obtaining an output signal to be monitored, scanning direction selecting means for selecting a scanning direction from the directions of the columns and rows, respectively, and coordinate step advancing means operable in one of the column and row directions in response to actuation of the respective scanning direction selecting means for causing the control switch means to successively select one-by-one the audio signals output from the training devices which are successively arranged in the selected column or row direction.

The above, and other objects, features and advantages of the present invention, will become apparent from the following detailed description of a preferred embodiment taken in conjunction with the accompanying drawings, throughout which like reference numerals designate like elements and parts.

DESCRIPTION OF THE PREFERRED EMBODIMENT

Figure 4:
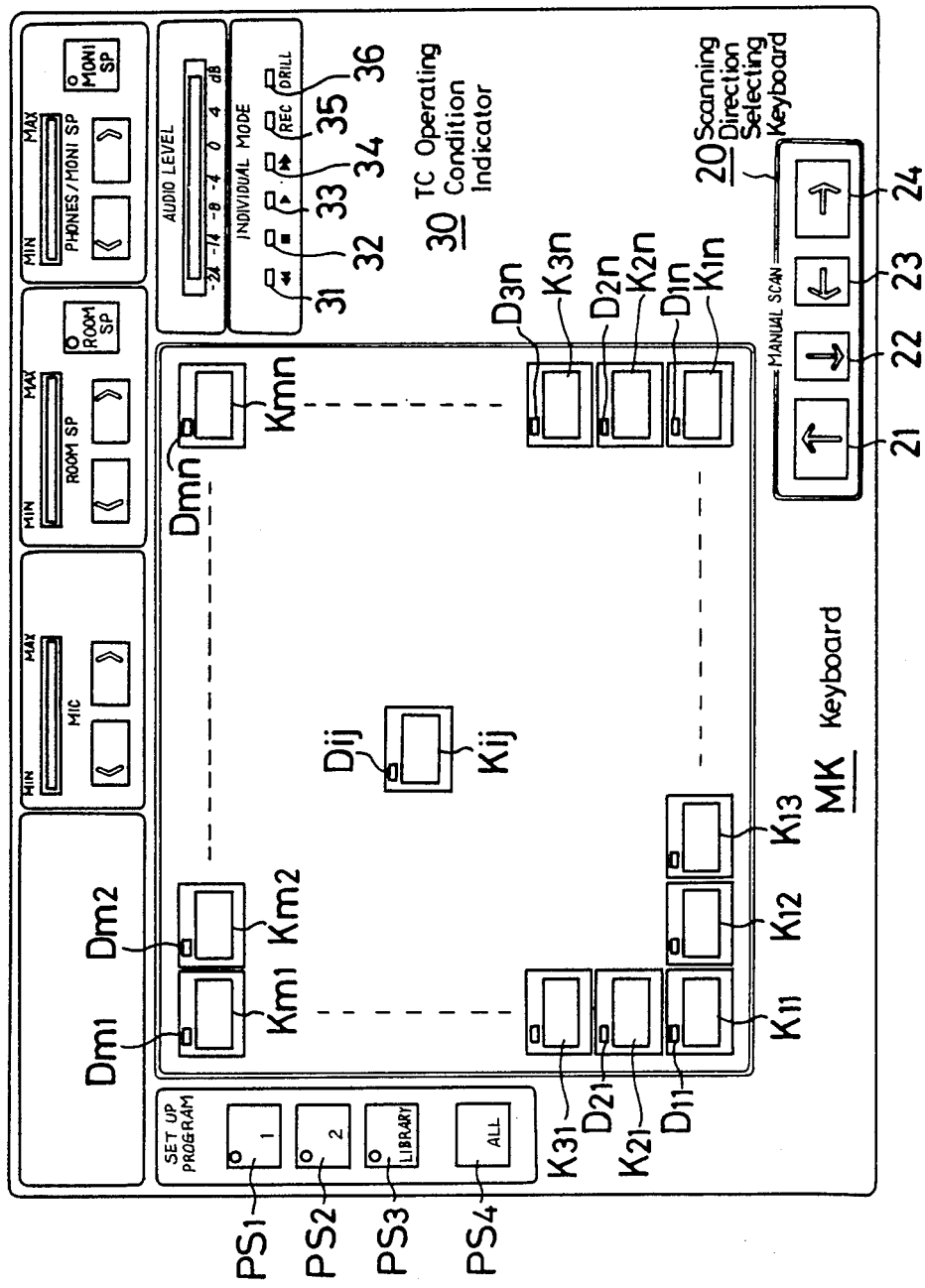
FIG. 4 is a diagrammatic front view of a control panel of the monitoring apparatus shown in FIG. 2.

Referring initially to FIG. 4 which shows a control desk or panel of a monitoring apparatus according to the invention, it will be seen that reference letters MK designate a keyboard made up of monitor keys $K_{11}$ to $K_{mn}$ corresponding to respective booths arranged in a matrix which has m rows and n columns. If an instructor operates or depresses a selected monitor key $K_{ij}$, he can monitor a trainee who is in a corresponding booth at the intersection of row i and column j. The monitor keys $K_{11}$ to $K_{mn}$ are provided with respective light emitting diodes (LED) $D_{11}$ to $D_{mn}$ for indicating the booth selected to be monitored. Reference numeral 20 designates a scanning direction selecting keyboard having keys 21,22,23 and 24 actuable for scanning in the forward, backward, left and right directions, respectively. Reference numeral 30 designates a tape recorder operating condition indicator panel which shows the operating condition of the tape recorder arranged in the booth being monitored. The tape recorder operating condition indicator panel 30 comprises a rewinding indicator LED 31, a stop indicator LED 32, a playback indicator LED 33, a fast forwarding indicator LED 34, a recording indicator LED 35, and a drill (repeat training) indicator LED 36. Reference numerals $PS_1$ to $PS_4$ designate respective training program selector switches.

Figure 5:
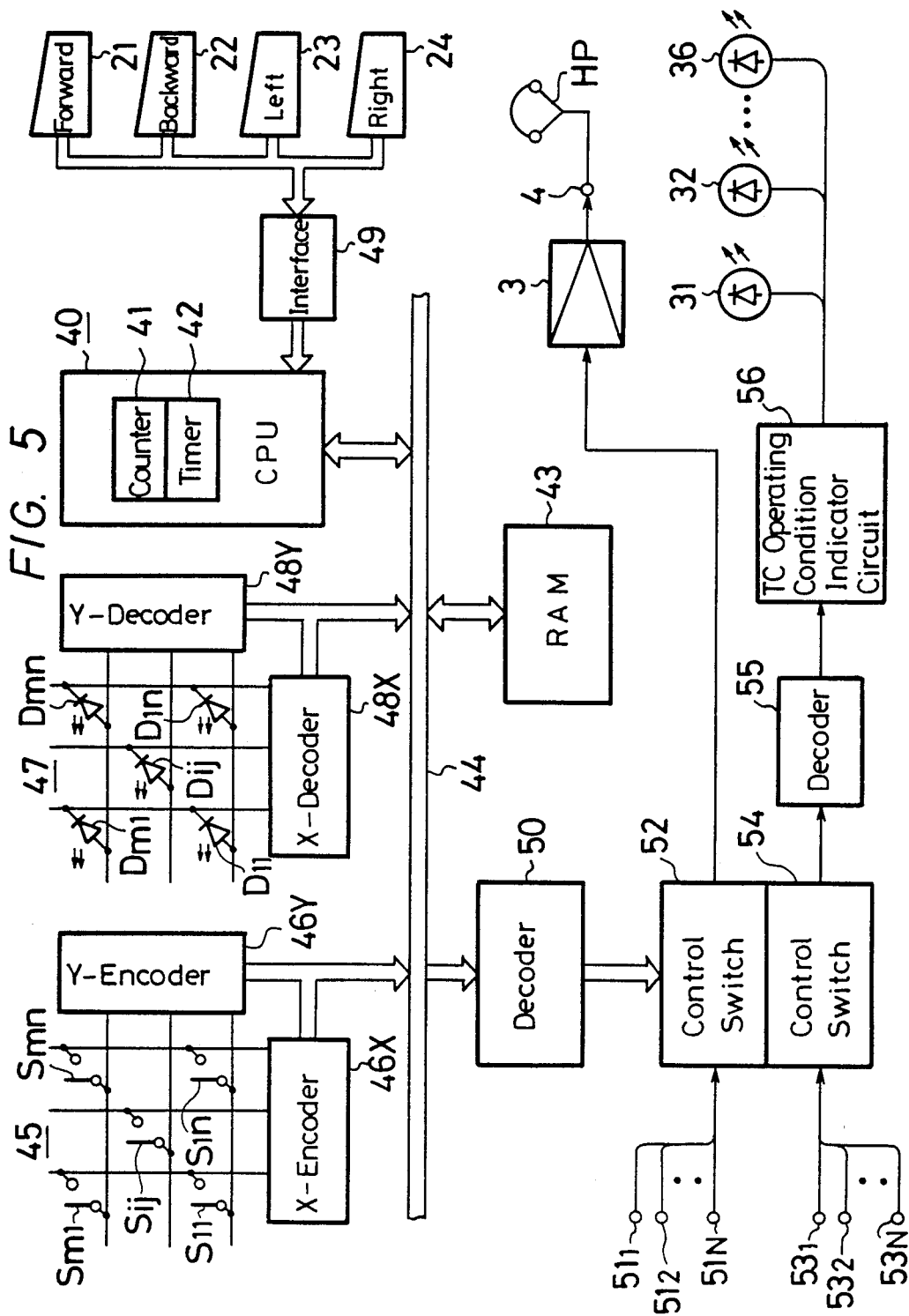
FIG. 5 is a block diagram showing, in greater detail, a circuit arrangement included in the monitoring apparatus of FIG. 2.

As shown on FIG. 5, the monitoring apparatus according to the invention includes a central processing unit (CPU) 40 which comprises a counter 41 and a timer 42. The CPU 40 and a RAM 43 are both connected to a data bus 44. A switch matrix 45 is provided with switches $S_{11}$ to $S_{mn}$ which correspond to the monitor keys $K_{11}$ to $K_{mn}$, respectively. If the selected monitor key $K_{ij}$ is depressed, data corresponding to the x-coordinate (column number j) and the Y-coordinate (row number i) of a switch $S_{ij}$ associated with the depressed monitor key $K_i$ are stored in RAM 43 through an X-encoder 46X and a Y-encoder 46Y, respectively, connected with data bus 44. Further, an LED matrix 47 is provided with the LEDs $D_{11}$ to $D_{mn}$ which are respectively provided in the monitor keys $K_{11}$ to $K_{mn}$, as mentioned above. When monitor key $K_{ij}$ is depressed, the data provided by encoder 46X and 46Y for the X-coordinate j and Y-coordinate i of monitor key $K_{ij}$ are supplied through bus 44 to an X-decoder 48X and a Y-decoder 48Y to cause illumination of the LED $D_{ij}$ provided in the corresponding monitor key $K_{ij}$. An interface 49 is provided for designating a scanning direction and generates key codes in response to actuations of the keys 21 to 24, respectively. The selected key code is supplied from interface 49 to counter 41 and timer 42 of CPU 40. A decoder 50 connected with bus 44 supplies control switches 52 and 54, which will be hereinafter described in detail, with scanning control data obtained in response to depressing of the selected monitor key $K_{ij}$ and one of direction keys 21 to 24.

Figure 1:
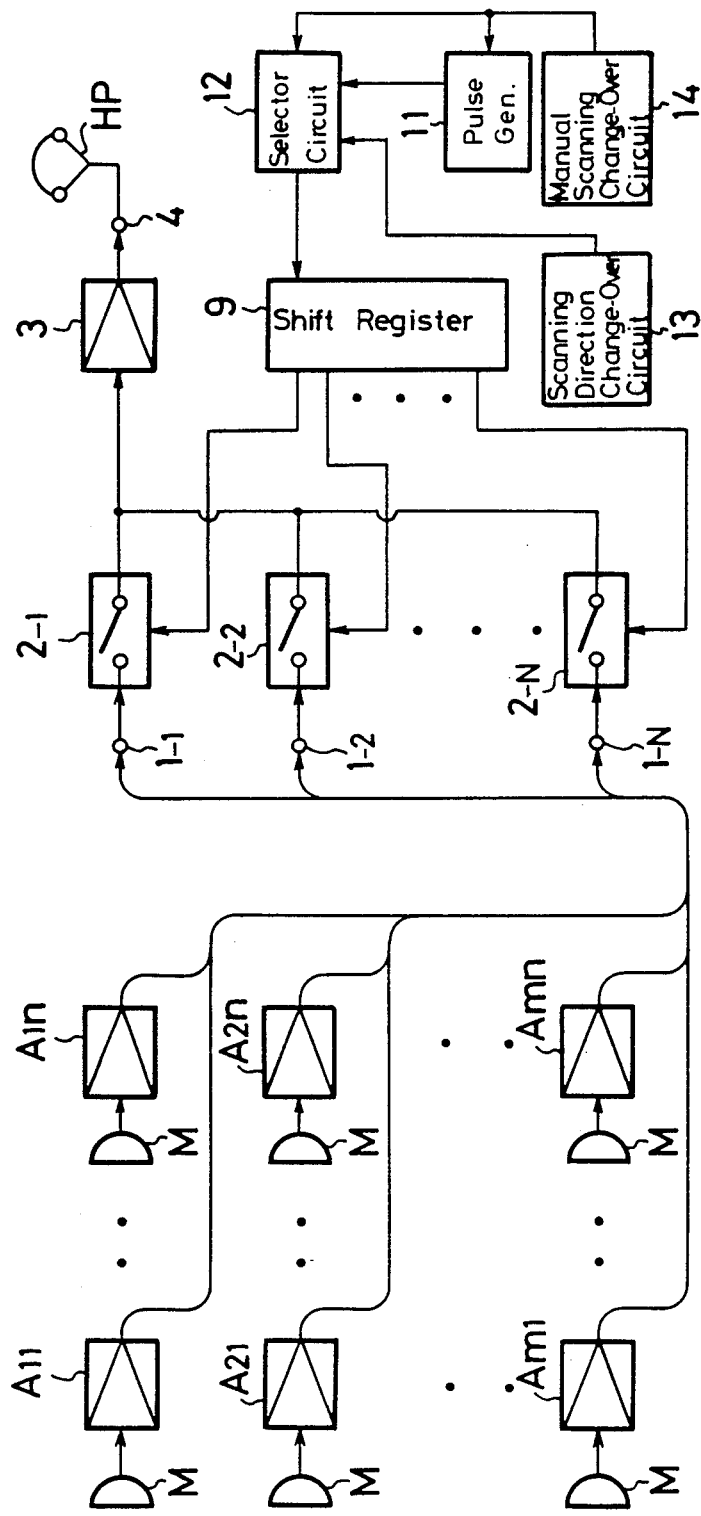
FIG. 1 is a block diagram showing a monitoring apparatus for training devices according to the prior art.

Reference numerals $51_1$ to $51_N$ designate audio signal input terminals which respectively correspond to N booths arranged in a matrix having m columns and n rows, that is, $N = m \times n$. The above-mentioned control switch 52 has N fixed contacts which respectively correspond to the N control circuits $2_{-1}$ to $2_{-N}$ shown in FIG. 1. The control switch 52 is controlled by an output signal from decoder 50 and connects the monitor amplifier 3 selectively with one of input terminals $51_1$ to $51_N$, whereby a pair of headphones HP connected to output terminal 4 is supplied with an audio signal from the trainee in a selected booth which is being monitored by the instructor, and simultaneously the LED $D_{ij}$ of the depressed monitor key $K_{ij}$ corresponding to the selected booth, is lit.

The control switch 54 is supplied with data indicative of the operating conditions of the tape recorders arranged in the respective booths through input terminals $53_1$ to $53_N$. The control switch 54 is constructed in the same manner as the above-described control switch 52 and is associated with control switch 52 to be operated with the latter in response to the output signal from decoder 50 for selectively connecting one of the input terminals $53_1$ to $53_N$ with a decoder 55. An output from decoder 55 is supplied to an operating condition indicator circuit 56 to indicate operating conditions of the tape recorder in a selected booth by lighting one of the indicator LEDs 31 to 36 situated on the panel shown in FIG. 4.

The operation of the monitoring apparatus according to the invention will now be explained with reference to the, in some respects, more detailed block diagram of FIG. 2, wherein, the same reference numerals are used to identify parts already described with reference to FIGS. 1,3,4 and 5 so that further explanation thereof will be omitted.

Figure 2:
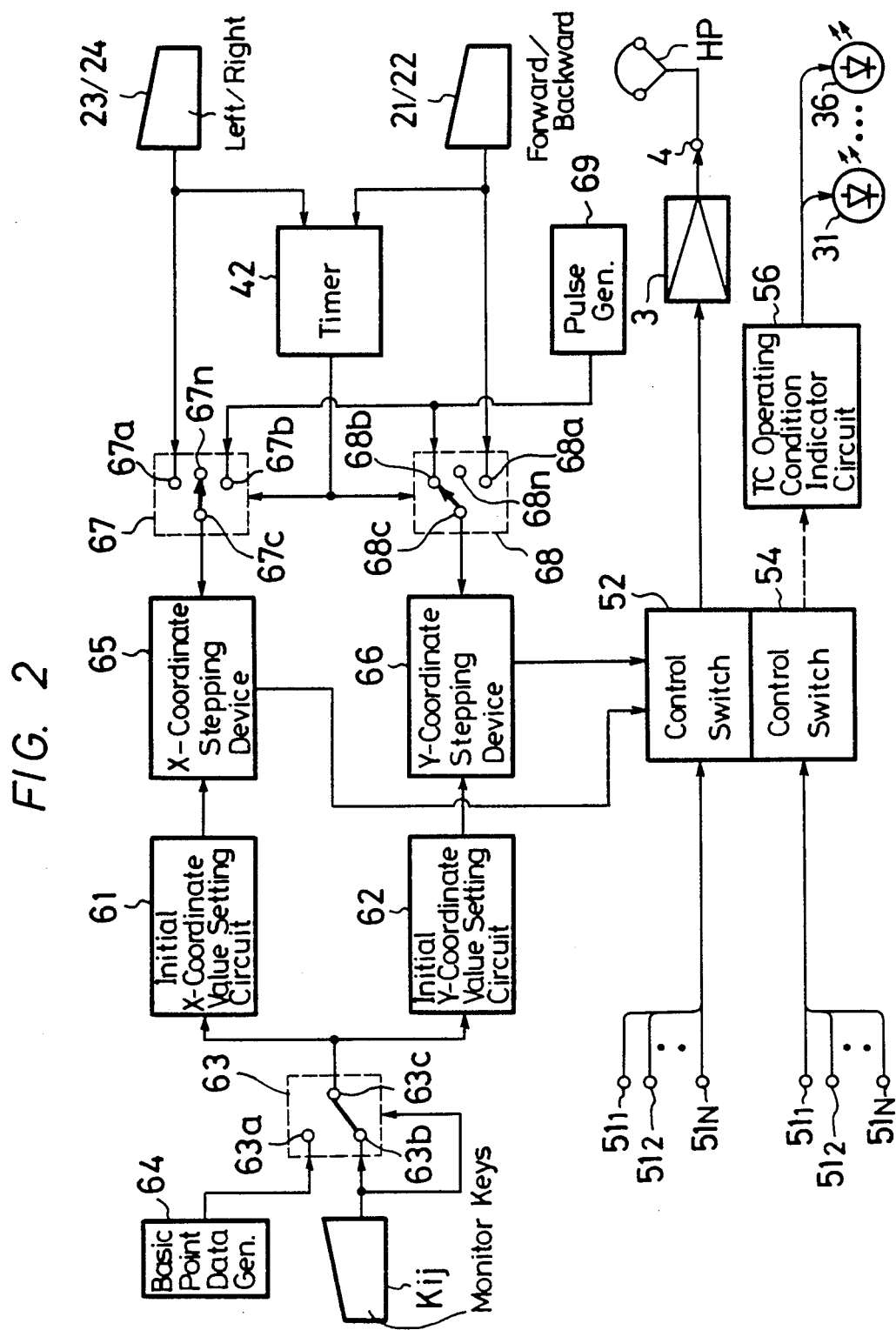
FIG. 2 is a block diagram showing a monitoring apparatus for training devices according to one embodiment of the present invention.

In FIG. 2, an initial X-coordinate value setting circuit 61 and an initial Y-coordinate value setting circuit 62 having their inputs connected in common to a movable contact 63c of a switch 63. One fixed contact 63a of switch 63 is connected with a basic point data generator 64 which generates data corresponding to the coordinates (x=1, y=1) of the monitor key $K_{11}$ for the booth located at the intersection of column 1 and row 1. Another fixed contact 63b of switch 63 is connected with a matrix switch $S_{ij}$ (FIG. 5) represented by the respective monitor keys $K_{ij}$. If monitor key $K_{ij}$ is depressed, switch 63 is actuated to the state shown in FIG. 2.

Reference numerals 65 and 66 designate an X-coordinate stepping device and a Y-coordinate stepping device, respectively, which may be constituted by counters. One input terminal of X-coordinate stepping device 65 is supplied with an output signal from initial X-coordinate value setting circuit 61 while the other input terminal thereof is connected with a movable contact 67c of a switch 67. Similarly, one input terminal of the Y-coordinate stepping device 66 is supplied with an output signal from the initial Y-coordinate value setting circuit 62 and its other input terminal is connected with a movable contact 68c of a switch 68. A first fixed contact 67a of switch 67 is connected with scanning keys 23 and 24 for scanning in the horizontal or left and right directions, and a second fixed contact 67b of switch 67 is supplied with an output signal from a pulse generator 69. A first fixed contact 68a of switch 68 is connected with scanning keys 21 and 22 for scanning in the vertical or up and down directions, and a second fixed contact 68b of switch 68 is also supplied with the output signal from pulse generator 69. The pulse generator 69 may desirably be a frequency divider circuit included in CPU 4 (FIG. 5) and having a suitable dividing ratio. Output signals from scanning keys 21 to 24 for selecting scanning in the respective directions are supplied to timer 42 of CPU 40, and the respective output signal from the latter is commonly supplied to both switches 67 and 68 as a control signal therefor. If none of scanning keys 21 to 24 are depressed, movable contacts 67c and 68c of switches 67 and 68 are positioned to engage respective open contacts 67n and 68n thereof, so that switches 67 and 68 are both in a neutral state. However, if it is assumed that, for example, scanning key 21 for effecting scanning in the forward direction is depressed, movable contact 68c of switch 68 is engaged with first fixed contact 68a. If scanning key 21 is kept depressed for more than a predetermined period of time, for example, for more than 1 second, as determined by timer 42, movable contact 68c is connected with second fixed contact 68b as shown in FIG. 2.

Output signals from the X-coordinate stepping device 65 and Y-coordinate stepping device 66 are both supplied to control switches 52 and 54.

Figure 3:
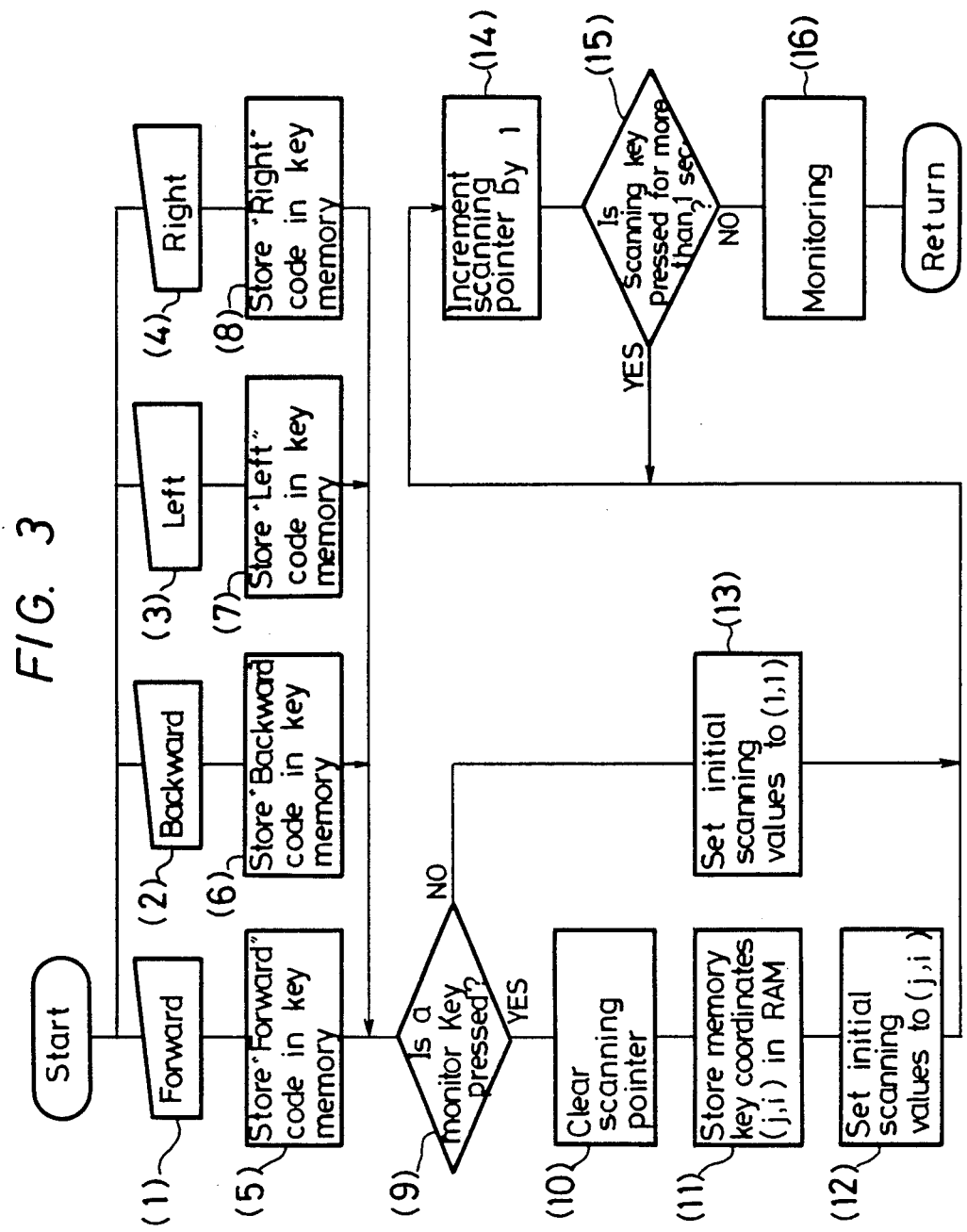
FIG. 3 is a flow chart to which reference will be made in explaining the operation of the monitoring apparatus shown in FIG. 2.

Next, the operation of the monitoring apparatus according to the invention will be explained with reference to the flow chart of FIG. 3.

If one of the scanning keys 21 to 24 is depressed for selecting scanning in the respective direction, that is, the forward, backward, left or right direction, as in any one of steps (1) to (4), a code representative of the selected scanning direction is stored in a key memory, as in the respective one of steps (5) to (8). Then, it is determined at step (9) whether or not a monitor key is depressed. If it is determined that a monitor key $K_{ij}$ at row i and column j of the monitor keyboard MK is depressed, a scanning pointer is cleared in step (10), data representing the X-coordinate (column number j) and the Y-coordinate (row number i) of the depressed key $K_{ij}$ are stored in RAM 43 in step (11), and initial values of the X-coordinate and the Y-coordinate are respectively set to j and i in step (12). If it is determined in step (9) that a monitor key $K_{ij}$ is not depressed while one of the scanning keys 21 to 24 is pressed, the initial values of the X-coordinate and the Y-coordinate are both set to "1" in step (13).

After the initial values of the X-coordinate and the Y-coordinate are thus set, the X-coordinate or Y-coordinate of the scanning pointer is stepped or incremented by "1" in one of the four directions, that is, the forward, backward, left or right direction, determined by the scanning key 21 to 24 which is depressed, as in step (14). For example, if the initial values are set to row i and column j, the selective depressing of scanning keys 21,22,23 and 24 will step the scanning pointer by 1 to row (i+1), column j; row (i−1), column j; row i, column (j−1); and row i, column (j+1), respectively. Further, if the initial values are set to row 1 and column 1, depressing scanning keys 21 and 24 for scanning in the forward and right directions will shift the pointer to row 2, column 1, or to row 1, column 2, respectively. If one of the scanning keys 22 and 23 is depressed, the pointer will be shifted to the last row and the last column, that is, the pointer is shifted to row m, column 1, or to row 1, column n, respectively.

Next, it is detected in step (15) by the use of timer 42 whether the depressed scanning key 21,22,23 or 24 is kept depressed for more than a predetermined period of time, for example, 1 second. For example, if forward scanning key 21 is kept depressed for more than the predetermined period of time, switch 68 is changed-over to the state shown in FIG. 2, as described above, and then is supplied with a pulse signal of a predetermined cyclic period by pulse generator 69, whereby the Y-coordinate of the scanning pointer is increased step by step until scanning key 21 is released from its depressed condition. Thus, booths arranged in the same column as that at row i, column j or at row 1, column 1, as set by the initial scanning values, are successively monitored in step (16). When the booth at the end of such column is monitored, monitoring returns to the first row in the same column. Successive monitoring is effected in the same manner in the backward, left and right directions when scanning keys 22,23 and 24, respectively are held in the depressed condition.

The initial values of the X-coordinate and the Y-coordinate set as described above and the X-coordinate and the Y-coordinate values after the step-by-step incrementing thereof are supplied to control switches 52 and 54 as control signals therefor, with the result that one of the audio signal input terminals $51_1$ to $51_N$ and one of the input terminals $53_1$ to $53_N$ for the booth corresponding to such coordinate values are selected and connected to the amplifier 3 and the tape recorder operating condition indicator circuit 56. Thus, in step (16), the voice of the trainee in the selected booth can be monitored by the instructor through the headphones HP. Also, the operating condition of the tape recorder in the selected booth is indicated by one of the indicator LEDs 31 to 36.

If the period of the pulse generated by pulse generator 69 is set to a small value, for example, 0.2 seconds, operating conditions of the tape recorders in the respective booths can be monitored, by observing the LEDs 31 to 36 turning on and off, for a short period of time.

In the above described embodiment of the invention, the monitoring apparatus is provided with the four scanning keys 21 to 24, each of which is exclusively used for causing scanning in one respective direction, so that the instructor can easily manipulate the keys, the software for the computer can be simplified, and thereby the reliability of the system is improved.

Also, since the instructor can successively monitor trainees in the booths arranged in any of the four directions, that is, forward, backward, left and right, the monitoring apparatus can be the same for use in Japan and, in countries foreign thereto.

Although a single preferred embodiment of the invention has been described above with reference to the accompanying drawings, it will be apparent that the invention is not limited thereto, and that many modifications and variations could be effected therein by one skilled in the art without departing from the spirit or scope of the invention as defined by the appended claims.

What is claimed is:

1. A monitoring apparatus for training devices arranged in columns and rows and operative to provide respective audio signals comprising:
   control switch means for selecting one-by-one said audio signals provided by the training devices and for obtaining therefrom an output signal to be monitored;
   scanning direction selecting means actuable for selecting a scanning direction from the directions of said columns and row; and
   coordinate step advancing means operable in one of the column and row directions in response to actuation of the respective scanning direction selecting means for causing said control switch means to successively select one-by-one for monitoring the audio signals provided by said training devices which are successively arranged in the selected column or row-scanning direction.

2. A monitoring apparatus according to claim 1; in which said scanning direction selecting means includes scanning keys actuable for scanning in the column direction and scanning keys actuable for scanning in the row direction; and further comprising detecting means providing an output signal when one of said keys is actuated for at least a predetermined period of time, and pulse signal generating means supplying a pulse to said coordinate step advancing means in response to said output signal from the detecting means.

3. A monitoring apparatus according to claim 1; further comprising coordinate presetting means for presetting said coordinate step advancing means in correspondence with selected positions along said columns and rows.

4. A monitoring apparatus according to claim 3; further comprising a plurality of monitor keys respectively corresponding to said training devices and being operable for selecting the corresponding training device for initial monitoring, and means for supplying coordinates of an operated one of said monitor keys to said coordinate presetting means.

5. A monitoring apparatus according to claim 1; in which each of said training devices includes a recording and reproducing device which provides the respective audio signal and also data indicative of operating conditions of said recording and reproducing device; and further comprising display means for displaying said operating conditions of the recording and reproducing device providing the audio signal selected for monitoring in accordance with said coordinate step advancing means.

* * * * *